United States Patent
Beck

(10) Patent No.: US 7,362,942 B2
(45) Date of Patent: Apr. 22, 2008

(54) SYSTEM AND METHOD OF GROUNDING FIBER STORAGE TRAYS

(75) Inventor: Ronald A. Beck, St. Paul, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/071,374

(22) Filed: Mar. 2, 2005

(65) Prior Publication Data

US 2006/0198594 A1 Sep. 7, 2006

(51) Int. Cl.
*G02B 6/00* (2006.01)
*G02B 6/46* (2006.01)

(52) U.S. Cl. ...................................... 385/135
(58) Field of Classification Search ........ 385/134–135; 361/608, 724
See application file for complete search history.

(56) References Cited

U.S. PATENT DOCUMENTS

| | | | | |
|---|---|---|---|---|
| 5,511,144 A | * | 4/1996 | Hawkins et al. | 385/135 |
| 6,082,845 A | * | 7/2000 | Eizadkhah et al. | 312/323 |
| 6,438,310 B1 | * | 8/2002 | Lance et al. | 385/135 |
| 6,504,988 B1 | | 1/2003 | Trebesch et al. | |

FOREIGN PATENT DOCUMENTS

| | | |
|---|---|---|
| EP | 0 514 638 A | 11/1992 |
| WO | 2004/034116 | 4/2004 |

OTHER PUBLICATIONS

Photographs of ADC Telecommunications, Inc. Ground Strap (1 page, 1999; Applicant's admitted prior art).*

ADC Telecommunications, Inc. ("Fiber Entrance Cabinet", 2001).*
Hoffman Enclosures, Inc. ("Setting New Standards", Specifier's Guide, vol. 20, Chapter 12: General Accessories, pp. 12.31 and 12.45, Rev. A, Oct. 2004).*
Photograph of a ADC Telecommunications, Inc. Door Grounding (typical round insulated wire with crimped-on terminals used to provide a solid grounding path from an enclosure door to the frame or cabinet), 1 Page, date unknown.
Photograph of a ADC Telecommunications, Inc. Door Grounding (heavier duty version of Ex. A with heavier terminals), 1 Page, date unknown.
Chomerics, div. of Parker Hannifin Corp., "Cho-Strap Insulated Ground Strap—Technical Bulletin 203", 1999, 1 Page.
American Grounding Systems, Inc., Web Page—Ground Strap Types, Printed Mar. 1, 2006, pp. 1-3.
American Grounding Systems, Inc., Web Page—Ground Wires—Tinned & Bare Copper, Printed Mar. 31, 2006, pp. 1-21.
American Grounding Systems, Inc., Web Page—Flat Nickel Plated Copper Ground Straps With Tinned Copper (TC) Crimp Terminals, Printed Mar. 1, 2006, pp. 1-35.

(Continued)

*Primary Examiner*—Michelle Connelly-Cushwa
(74) *Attorney, Agent, or Firm*—Merchant & Gould P.C.

(57) ABSTRACT

An optical fiber cable management panel includes drawer assemblies, each including a drawer slidable within a chassis. The chassis incorporates a grounding point, and the drawer assemblies are electrically connected to the grounding point by a grounding strap. The grounding strap flexes to allow the slidable movement of the drawer relative to the chassis. The strap may be folded one or more times. The strap may be bolted, welded, or otherwise conductively and non-rotatably affixed at each end to the drawer and the chassis so as to maintain a constant position within the assembly and a constant electrical connection between the drawer and the grounding point.

16 Claims, 5 Drawing Sheets

OTHER PUBLICATIONS

American Grounding Systems, Inc., Web Page—Tubular Stainless Steel Ground Straps With Tinned Copper (SS) Crimp Terminals, Printed Mar. 1, 2006, pp. 1-19.

American Grounding Systems, Inc., Web Page—Solid Flat 304 Stainless Steel Grounding Straps—With Heat/No Heat Shrink Overlay, Printed Mar. 1, 2006, p. 1.

American Grounding Systems, Inc., Web Page—304 Stainless Steel Grounding Straps—All Straps Measured Hole Center to Hole Center, Printed Mar. 1, 2006, p. 1.

American Grounding Systems, Inc., Web Page—Tinned Copper Grounding Straps—All Straps Measured Hole Center to Hole Center, Printed Mar. 1, 2006, p. 1.

American Grounding Systems, Inc., Web Page—Bare & Sold Copper Straps—Sold Round, Flat & Tubular Copper, Printed Mar. 1, 2006, pp. 1-4.

American Grounding Systems, Inc., Web Page—Copper Grounding Strips—Low Impedance, Reduced EMI Radiation (Made of Flexible Solid Copper Strip With Solder Dipped Ends and Punched Holes on Both Ends), Printed Mar. 1, 2006, pp. 1-3.

American Grounding Systems, Inc., Web Page—Tubular Tinned Copper Grounding Straps—With Heat/No Heat Shrink Overlay, Printed Mar. 1, 2006, p. 1.

American Grounding Systems, Inc., Web Page—Flat Tinned Copper Grounding Straps—With Heat/No Heat Shrink Overlay, Printed Mar. 1, 2006, p. 1.

American Grounding Systems, Inc., Web Page—Large Flat Tinned Copper Grounding Straps—With Heat/No Heat Shrink Overlay, Printed Mar. 1, 2006, p. 1.

American Grounding Systems, Inc., Web Page—Custom Ground Strap Design, Printed Mar. 1, 2006, pp. 1-10.

American Grounding Systems, Inc., Web Page—Metal Braids—Available Braid Stocks (Bare, Copper, Tinned Copper, Nickel Plated Copper, Stainless Steel, Aluminum), Printed Mar. 1, 2006, pp. 1-7.

* cited by examiner

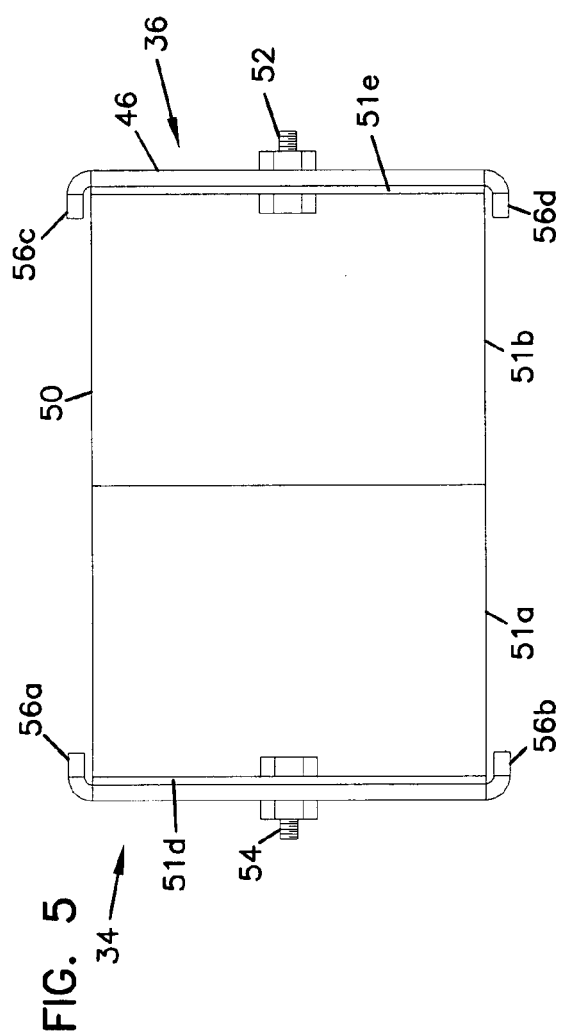
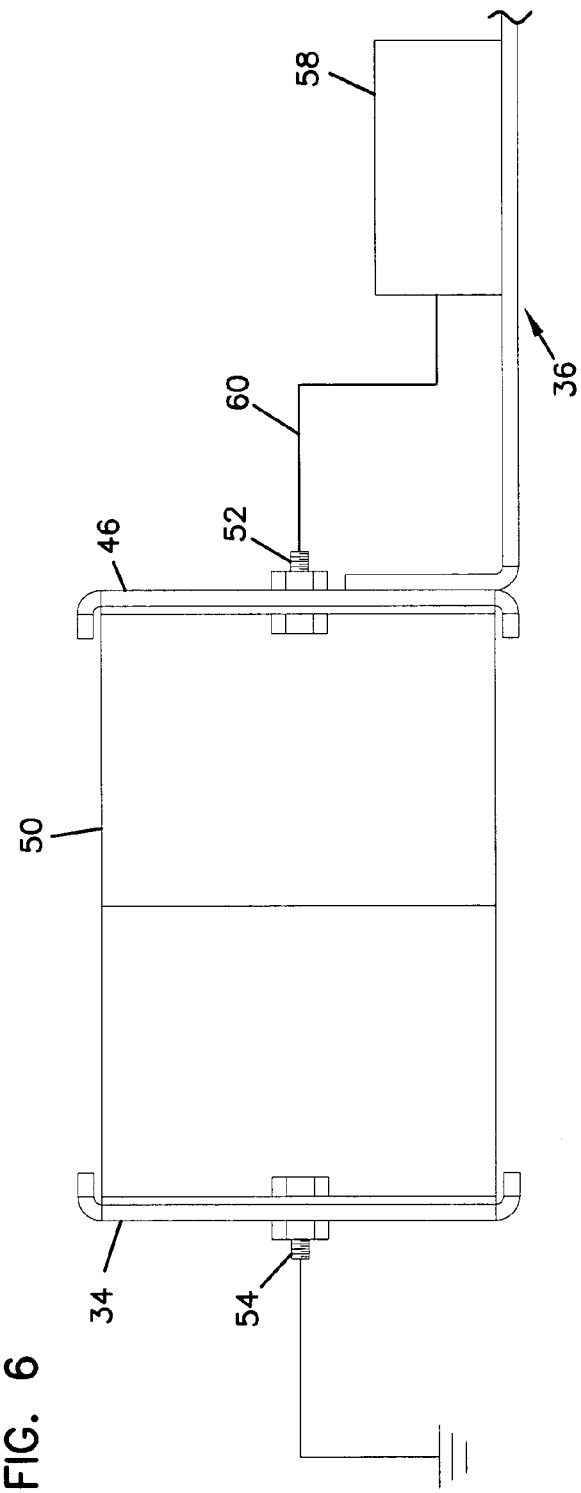

SYSTEM AND METHOD OF GROUNDING FIBER STORAGE TRAYS

TECHNICAL FIELD

This disclosure concerns management of optical fiber cables. In particular, this disclosure relates to grounding of optical fiber cable storage devices in the telecommunications industry.

BACKGROUND

Cable termination, splice, and storage devices are known including, for example, devices shown in U.S. Pat. Nos. 6,438,310 and 6,504,988, both assigned to ADC Telecommunications, Inc. Both of these patents concern devices with slidable drawers for storage and management of the optical fiber cables. The slidable drawers are connected to a grounded chassis via a pair of ball bearing slides. These ball bearings provide insufficient and unreliable grounding for active fiber and electronics stored in the drawers. The slidable drawers may also be connected to the chassis via a non-conductive slide mechanism, or may be connected to a non-conductive portion of the chassis. So, reliance on the slide mechanism for grounding may not be effective.

The slidable drawers contain the trays that hold many strands of optical fiber. There is a growing need for added active electronic or electro-optical devices, such as LED driver and display combinations, optical amplifiers, or lasers to be included in the drawers. As more active and passive electronic and electro-optical equipment is added to the drawers, a reliable grounding mechanism is needed.

Therefore, improvements are desirable.

SUMMARY

In one aspect, the present invention concerns an optical fiber cable management system. The management system includes a chassis incorporating a grounding point and a drawer assembly slidably mounted within the chassis on a drawer slide. A flat grounding strap is attached to the grounding point and the sliding drawer. The strap flexes to accommodate the movement of the drawer along the drawer slide.

A method of grounding an optical fiber cable management panel is also provided. This method includes providing a chassis incorporating a grounding point and a drawer slidably mounted within the chassis. The method also includes electrically connecting the grounding point to the slidable drawer with a grounding strap. Opposing ends of the grounding strap are attached to the drawer and grounding point respectively so as allow the strap to flex. The strap flexion accommodates the movement of the drawer relative to the chassis.

BRIEF DESCRIPTION OF THE DRAWINGS

FIG. 5 is a side view of the area of the panel of FIG. 3 between the drawer and chassis;

FIG. 6 is a side view of the area of the panel in FIG. 3 inside the drawer and between the drawer and chassis.

DETAILED DESCRIPTION

Figure 1:
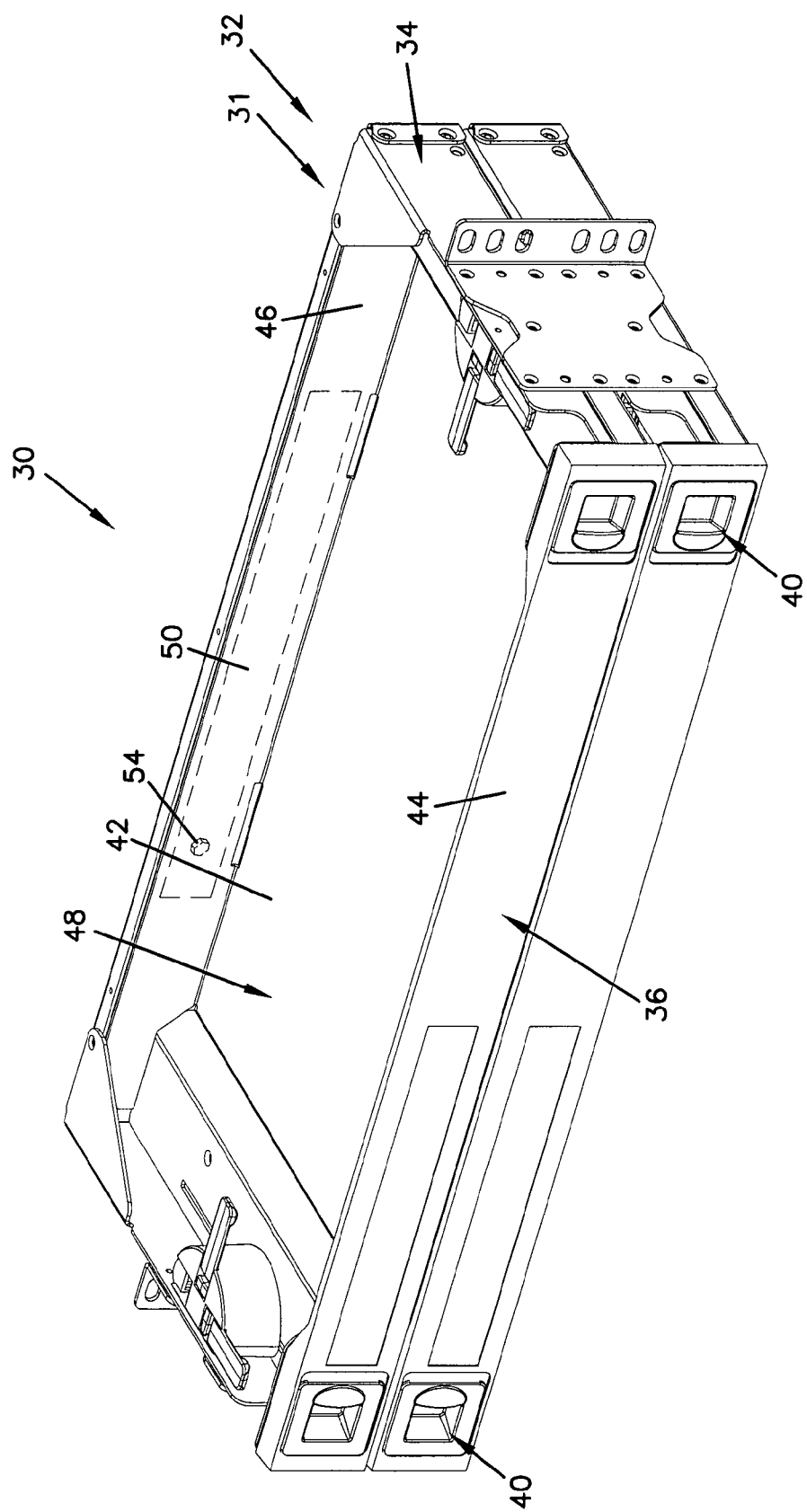
FIG. 1 is a perspective view of a cable management panel, depicting two closed drawers.

A cable management panel or module is depicted in FIG. 1 generally at 30. The panel 30 includes one or a plurality of drawer assemblies 32. In the one shown in FIG. 1, the panel 30 includes two drawer assemblies 32. Each of the drawer assemblies 32 includes a chassis 34 and a drawer 36 slidably mounted within the chassis 34.

Each drawer 36 may include cable management structure, for example, devices for storing the cables or connecting the cables to other cables or fiber optic devices, such as attenuators, couplers, switches, wave division multiplexers, splitters or splices. Each drawer 36 may also include active electronic or electro-optical devices, such as LED driver and display combinations, optical amplifiers, or lasers. Each drawer 36 includes two latches 40 to secure the drawer 36 in a closed position (the position shown in FIG. 1).

Each drawer 36 includes a base 42, a front wall 44 and a rear wall 46. Note that the drawer 36 is absent of side walls, or is "side wall-free." This structure allows for cable entry and exit and prevents cable damage during sliding movement of the drawers 36 when accessing the cables and connectors or other devices in the drawer 36. The base 42, front wall 44 and rear wall 46 together define a storage interior 48 for holding and storing the cables.

The chassis 34 incorporates a grounding point for electrical connection to a facility ground, such as a bolt 54. To ground the drawer 36, the rear wall 46 is electrically connected to the bolt 54 through a grounding strap 50. The grounding strap 50 is flexible and is made of stainless steel, nickel silver, or some similar conductive flexible material.

Each storage interior 48 is sized for receiving cable management and/or distribution structures. When the drawer 36 is in the closed position, the cables and management or distribution structures in the storage interior 48 are protected. In preferred embodiments, the distribution structures can be conveniently mounted on a tray insert (not shown) that drops into the storage interior 48. Example tray inserts are shown and described in U.S. Pat. Nos. 6,438,310 and 6,504,988, the disclosures of which are hereby incorporated by reference. This allows for convenient structuring of the drawer 36 to serve one or more desired functions in the panel 30. In the embodiment illustrated, each of the drawers 36 is constructed to be stackable and linkable to form sub-cable management panels 31. Such modularity also allows for ease of use for a variety of different needs for the cable management system.

Figure 2:
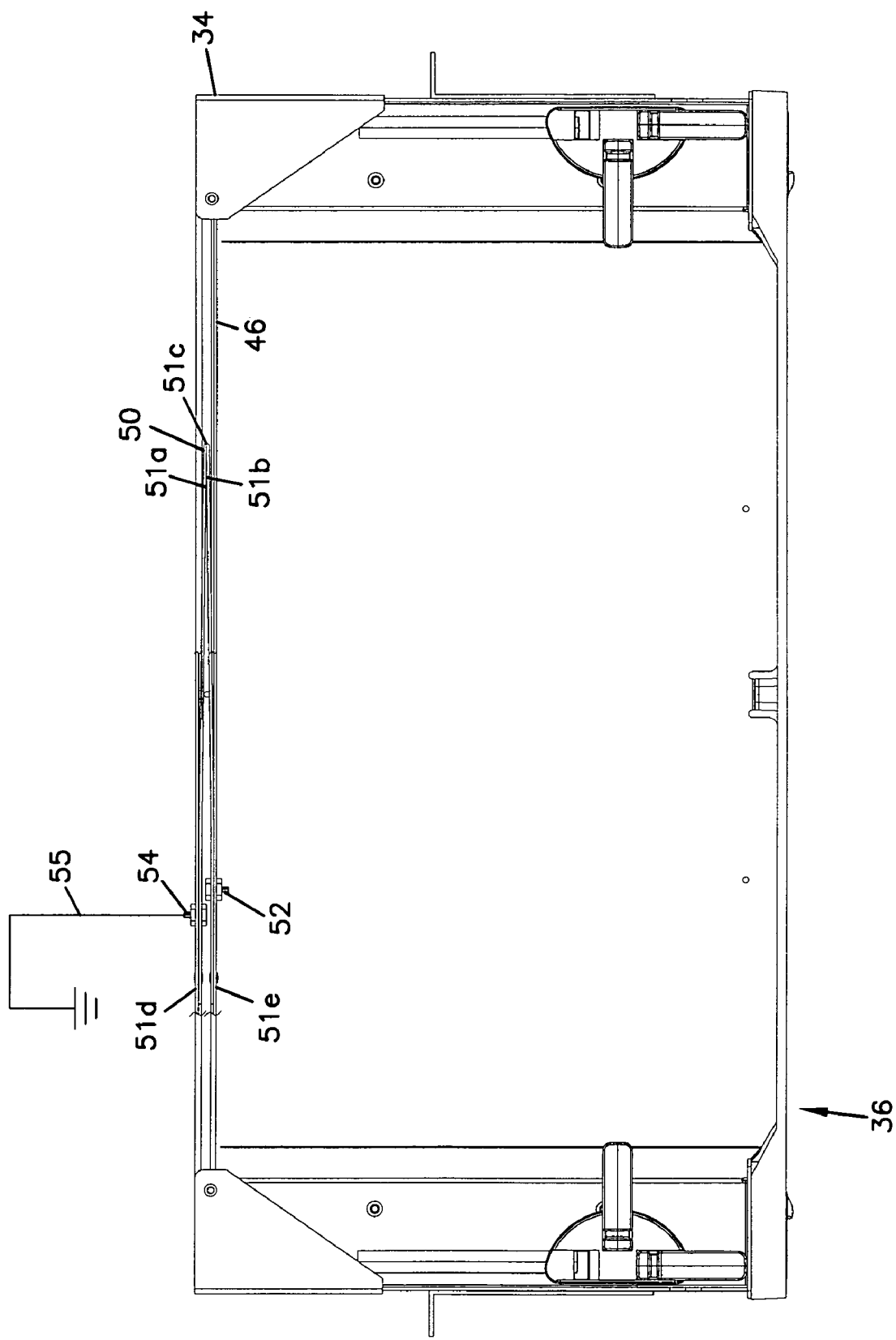
FIG. 2 is a top view of the panel of FIG. 1.

Referring to FIG. 2, a top view of the cable management panel with the drawer 36 in a closed position is shown. The grounding strap 50 is attached at each end to chassis 34 and rear wall 46 of drawer 36, respectively. This conductive attachment may be accomplished with bolts 52 and 54. When the drawer 36 is in the closed position, the strap 50 is compressed into a folded position where ends of the strap 50 approach each other. The bolt 54 attached to the chassis 34 provides a grounding point for the cable management panel. Grounding may be accomplished by electrically connecting the bolt 54 to a facility electrical ground 55.

The drawer 36 has conductive properties, and includes rear wall 46 that in the preferred embodiment is comprised of conductive material such as metal. The rear wall 46 is electrically connected to any electrical equipment contained within drawer 36, possibly through attachment to a metallic base of the drawer 36. One of skill in the art will recognize that rear wall 46 need not be conductive. In this case, the metallic base of drawer 36 or other elements requiring a ground connection may be electrically connected to bolt 52 by a conductive wire (see, for example, FIG. 6).

The grounding strap 50 electrically connects the drawer 36 to the chassis 34. The grounding strap 50 is attached at each end to chassis 34 and rear wall 46 of the drawer 36, respectively. In the preferred embodiment, the grounding strap 50 has two legs 51a and 51b. The legs 51a and 51b are separated by a bend 51c. The legs 51a and 51b have end regions 51d and 51e, respectively. End region 51e is attached to the rear wall 46 by a bolt 52. Likewise, end region 51d is attached to the chassis 34 by a bolt 54. The end regions 51d and 51e may be attached in one or more places or may be otherwise supported so that gravity or other forces do not cause it to rotate out of a preferred position, as shown (see also FIG. 5). Bolts 52 and 54 may be offset with respect to each other so as to minimize the distance between rear wall 46 and chassis 34 when drawer 36 is in a closed position.

Various structures or combinations of structures may be used for affixing the strap 50 to the chassis 34 and rear wall 46 of the drawer 36 in such a manner that the affixing structure maintains continuous electrical contact and a grounding point while preventing rotation of the strap 50. In a preferred embodiment, bolts 52 and 54 affix the strap 50 to the chassis 34 and the rear wall 46, while flanges on the rear wall 46 and chassis 34 prevent rotation out of a preferred position (as shown and discussed in FIGS. 5 and 6, below). In an alternate embodiment, a second affixing structure such as a rivet, weld, or other mechanical attachment configuration such as a lance may be used in combination with bolt 52 and/or 54 to prevent rotation of the strap 50 out of a preferred position. In such an embodiment, the flanges shown and described in FIGS. 5 and 6 are optional.

In another embodiment of the present disclosure, an alternative affixing structure may be substituted for bolt 52. For example, a rivet, weld, or other mechanical attachment configuration such as a lance may be used to attach the grounding strap 50 to the rear wall 46 of drawer 36 instead of bolt 52. The bolt 54 is a preferred structure for attaching a discreet grounding conductor to the facility electrical ground 55; however, alternate conductive attachment mechanisms providing a grounding point may similarly be implemented. These alternative affixing structures may be used in combination with the flanges shown and described in FIGS. 5 and 6, or any of the other structures mentioned herein for maintaining the grounding strap in a preferred position.

Figure 3:
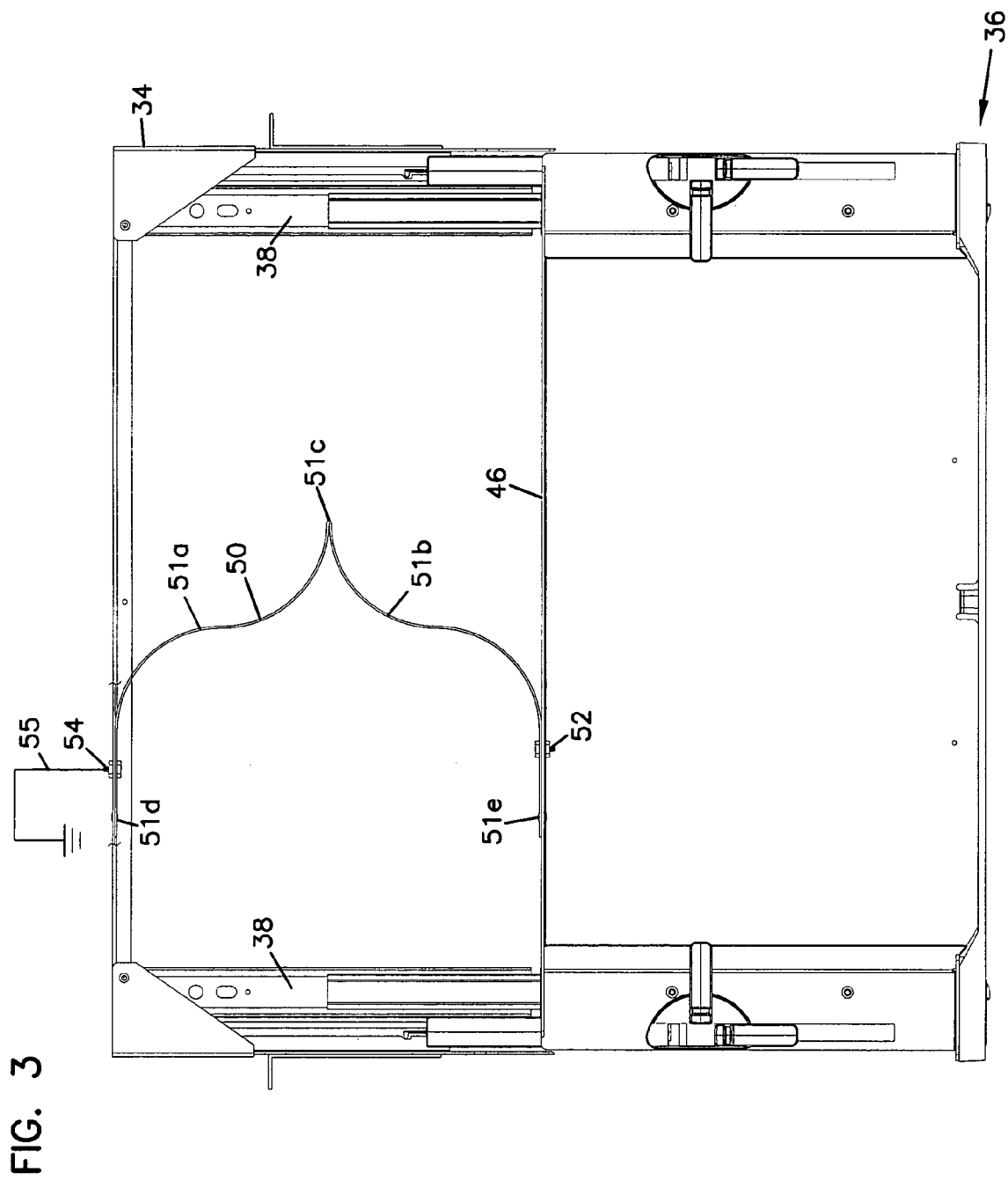
FIG. 3 is a top view of the panel of FIG. 2 with one drawer in the open position.

Referring to FIG. 3, a top view of the cable management panel with the drawer 36 in an open position is shown. Each drawer 36 is slidable relative to chassis 34 by way of two drawer slides 38 on opposite sides of the chassis 34. The grounding strap 50 is flexible, and flexes into a "wishbone" shape when the drawer 36 is in an open position. The grounding strap 50 defines a conductive path from the drawer 36 to the grounding point 55 when the drawer 36 is in either an open or a closed position.

Figure 4:
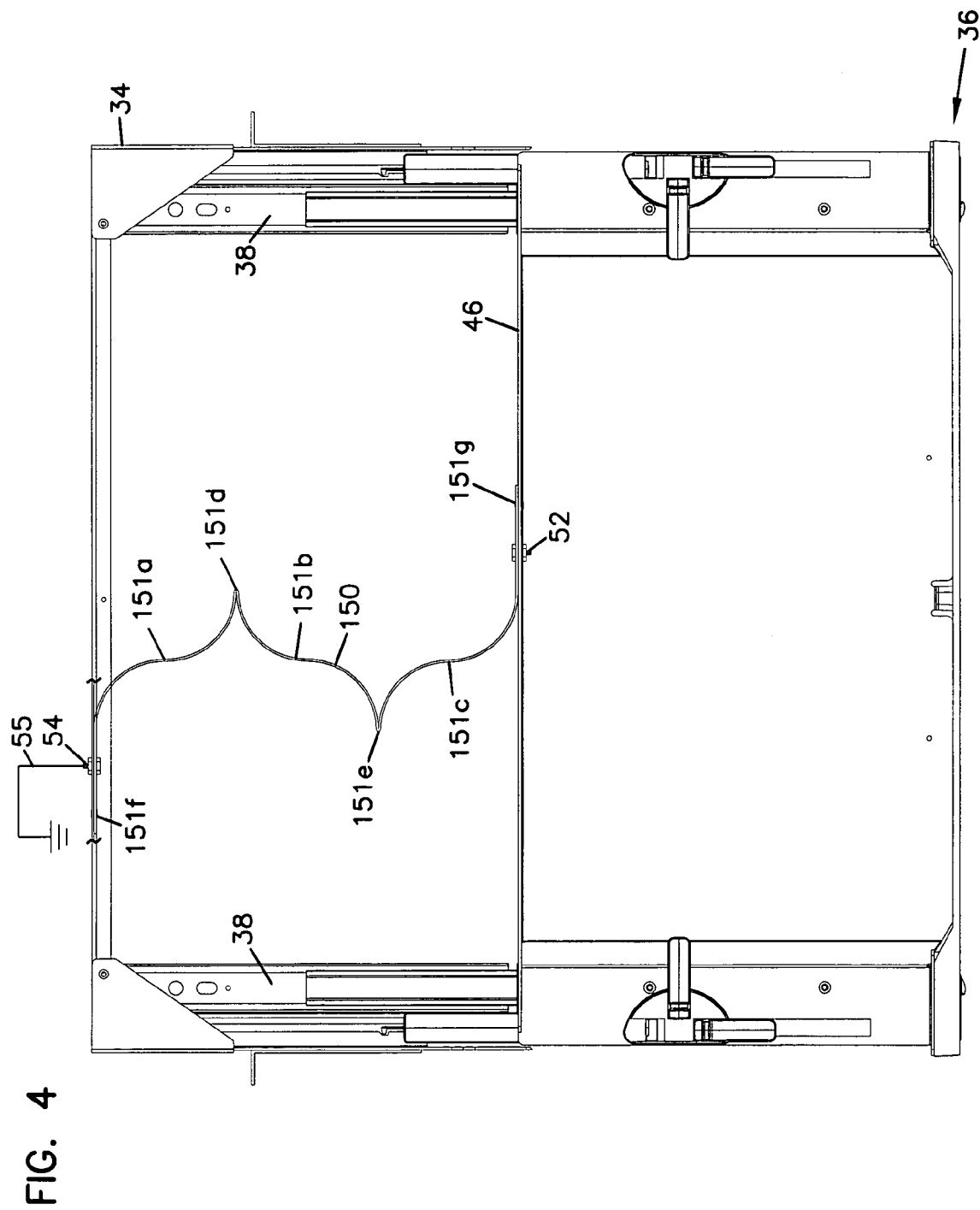
FIG. 4 is a top view of another possible embodiment of the cable management panel with one of the drawers in the open position.

Referring to FIG. 4, a further embodiment of the present disclosure is shown, with the drawer 36 in an open position. A grounding strap 150 attaches to the chassis 34 and the rear wall 46 of drawer 36. The grounding strap is separated into three legs 151a, 151b, and 151c, respectively. The three legs 151a, 151b, and 151c are separated by two folds 151d and 151e. Two regions of the grounding strap 151a and 151c have end regions 151f and 151g. End region 151f attaches to the chassis 34 with a fastener such as a bolt 54. End region 151g attaches to the rear wall 46 with a fastener such as a bolt 52. The drawer 36 is slidable relative to the chassis 34 by way of two drawer slides 38 on opposite sides of the chassis 34. In this embodiment, the grounding strap 150 flexes into a "z" or "double-wishbone" shape to accommodate the drawer 36 as it slides on the drawer slides 38 into open or closed positions.

Referring to FIG. 5, a side view of the area between the chassis 34 and the rear wall 46 of the drawer 36 is shown for the open drawer configuration (see, for example, FIG. 3) in a possible embodiment of the present disclosure. The drawer 36 has rear wall 46 that could be conductive, and may be made from metal. The chassis has a top flange 56a and a bottom flange 56b. The drawer 36 has a top flange 56c and a bottom flange 56d adjacent to the rear wall. The vertical distance between the top flanges 56a and 56c and the bottom flanges 56b and 56d is the same, and allows a grounding strap 50 to fit between the flanges. The grounding strap 50 has two legs 51a and 51b. The legs are separated by a fold 51c. The legs 51a and 51b have end regions 51d and 51e, respectively. The end region 51e is attached to the drawer 36 by a fastener 52. The end region 51d is attached to the chassis 34 by a fastener such as a bolt 54. The end regions 51d and 51e have a width that corresponds to the distance between the top and bottom flanges of the chassis 34 and drawer 36, respectively. This prevents the grounding strap 50 from pivoting about an axis defined by bolts 52 and 54, yet allows only two bolts to be used.

Referring to FIG. 6, a side view of the area inside the drawer 36 and between the chassis 34 and the rear wall 46 of the drawer 36 is shown for the open drawer configuration (see, for example, FIG. 3) in a possible embodiment of the present disclosure. The drawer 36 has rear wall 46 that need not be conductive, and chassis 34 may also no longer be conductive. A grounding strap 50 is attached to the drawer 36 and chassis 34 by fasteners, such as bolts 52 and 54, respectively. An active device 58 requiring grounding, such as LED driver and display combinations, optical amplifiers, or lasers, may be located within the drawer 36. The active device 58 is attached to a wire 60 that provides an electrical connection between the device 58 and bolt 52. Bolts 52 and 54 are conductive, and along with grounding strap 50 and wire 60 define a conductive path from the device 58 in the interior of drawer 36 to the exterior of the chassis 34, allowing for electrical connection to the facility electrical ground 55. One of skill in the art will recognize that additional wires may be connected from one or more components or conductive planes (such as the metallic base described above) in the drawer 36 to bolt 52 to provide multiple grounding paths.

When grounding straps 50, 150 are used, grounding of the drawers 36 is through straps 50, 150 and bolts 52 and 54. Drawer slides 38 no longer need to define an electrically conductive path. Drawer slides 38 can be made from non-electrically-conductive materials if desired.

The above specification, examples and data provide a description of the manufacture and use of the composition of the disclosure. Since many embodiments of the disclosure can be made without departing from its spirit and scope, the invention resides in the claims hereinafter appended.

The claimed invention is:
1. An optical fiber cable management system comprising:
(a) a chassis incorporating a grounding point;
(b) a drawer slidably mounted within said chassis;
(c) a drawer slide mounted within said chassis to accept said drawer;

(d) a flat grounding strap wherein opposing ends of said strap are fixed to said grounding point and said drawer such that said strap flexes to accommodate movement of said drawer relative to said chassis and along said drawer slide, and wherein the grounding strap is folded one or more times to accomplish the flexing.

2. The system of claim 1, wherein the grounding strap is comprised of stainless steel.

3. The system of claim 1, wherein the grounding strap is comprised of nickel and silver.

4. The system of claim 1, wherein the grounding strap is fastened with fasteners near opposite ends to a back portion of the slidable drawer and the chassis, respectively.

5. The system of claim 4, wherein the fasteners are positioned to reduce spacing between a back portion of the slidable drawer and the chassis.

6. The system of claim 4, wherein the fasteners are offset with respect to each other to reduce spacing between a back portion of the slidable drawer and the chassis.

7. The system of claim 4, wherein at least one fastener is a bolt.

8. The system of claim 1, wherein one or more mechanical attachment configurations fasten opposite ends of the grounding strap to a back portion of the slidable drawer and the chassis, respectively.

9. The system of claim 1, wherein the grounding strap is electrically bonded near opposite ends to a back portion of the slidable drawer and the chassis, respectively.

10. A method of grounding an optical fiber cable management panel; the method comprising:
(a) providing a chassis incorporating a grounding point, a drawer slidably mounted within said chassis, and a drawer slide mounted within said chassis to accept said drawer;
(b) electrically connecting said slidable drawer to said grounding point by affixing opposing ends of a flat grounding strap to a rear of said drawer and said grounding point;
(c) moving said slidable drawer from a closed position to an open position, wherein said grounding strap flexes to accommodate movement of said drawer relative to said chassis, and wherein the grounding strap is folded one or more times to accomplish the flexing.

11. An optical fiber cable management system comprising:
(a) a chassis incorporating a grounding point;
(b) a drawer slidably mounted within the chassis, the drawer including a rear wall;
(c) a drawer slide mounted within the chassis to accept the drawer;
(d) a flat grounding strap wherein opposing ends of the strap are non-pivotally fixed to the grounding point and the rear wall such that the strap flexes to accommodate movement of the drawer relative to the chassis and along the drawer slide, and wherein the grounding strap is folded one or more times to accomplish the flexing.

12. The system of claim 11, wherein the strap is fixed to a back portion of the chassis.

13. The system of claim 11, wherein the strap is fixed with fasteners to the rear wall of the drawer and the chassis.

14. A telecommunications equipment management system comprising:
(a) a chassis including a first planar surface including a grounding location;
(b) a drawer slidably mounted within said chassis and including a second planar surface generally parallel to said first planar surface;
(c) a drawer slide within said chassis to accept said drawer, wherein said drawer slides in a direction transverse to said first and second planar surfaces;
(d) a grounding strap having a flat shape in cross-section, said grounding strap including at least one intermediate vertex, and first and second ends mounted to said first and second planar surfaces, respectively, to electrically ground said drawer to said chassis.

15. The system of claim 14, wherein the first and second ends and the vertex of the grounding strap define a wishbone shape when the drawer is moved to an extended position relative to the chassis.

16. The system of claim 14, wherein the vertex is a first vertex, and wherein the grounding strap includes a second vertex, wherein the first and second ends and the first and second vertexes define a double wishbone shape when the drawer is moved to an extended position relative to the chassis.

* * * * *